Jan. 27, 1953 W. K. SCHNEPF 2,626,587
LOST MOTION OR BACKLASH COMPENSATION
Filed April 13, 1949

*INVENTOR.*
WILLIAM K. SCHNEPF
BY
*J. L. Bowes*
ATTORNEY

Patented Jan. 27, 1953

2,626,587

UNITED STATES PATENT OFFICE 2,626,587

LOST MOTION OR BACKLASH COMPENSATION

William Karle Schnepf, Webster, N. Y., assignor to Stromberg-Carlson Company, a corporation of New York Application April 13, 1949, Serial No. 87,241

5 Claims. (Cl. 116—133)

My present invention relates to lost motion or backlash compensation and more particularly to means for compensating for lost motion or backlash in indirectly controlled adjusting systems for mechanical movements which may have substantial backlash or lost motion in parts outside of the adjusting system.

In many types of adjustment or control systems for mechanical movements, indicating means is provided to apprise an operator of the position of the movement. For example, a dial is commonly used in connection with radio equipment to indicate the positioning of the variable element or elements of tuned circuits and controls and indicating means are commonly employed in machine tools such as lathes, etc. In many cases, there may be lost motion in the driving or adjusting mechanism. For example, in gear trains, there may be lost motion because of wide tolerances in cutting the teeth of the gears or because of wear in operation. Again, hermetically sealed equipment may be provided with an indirect drive from external control or adjustment mechanism and such indirect drive may include lost motion. In such cases, it may be desirable to minimize the effect of such lost motion and to minimize errors in setting or tuning the mechanical movement as, for example, the proper dial setting of radio equipment.

It is an object of my present invention to provide new and improved means for compensating for the effect of lost motion in mechanical movements and to provide a true indication at all times of the actual position of the apparatus involved.

My invention, in a preferred embodiment, accomplishes the foregoing object by causing the fiducial mark of suitable indicating means to move with the adjustment or control means, such as a dial, during the movement of the dial or the like corresponding to the taking up of lost motion in the system, but is held against movement with respect to the adjusting or control means, such as the dial, during actual changes in position of the mechanical movement involved. This arrangement permits the fiducial mark to move an amount proportional to the established backlash or lost motion in each particular system, thereby eliminating the backlash or lost motion effect, and yet permits true registration of the position of the apparatus being adjusted or tuned on the dial or other indicating means in either direction of rotation.

Figure 2:
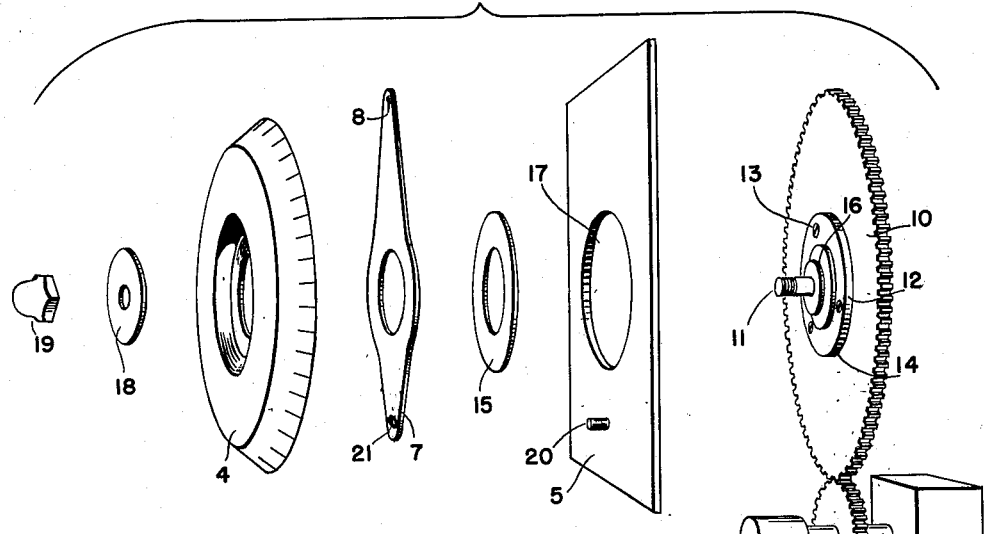
Figure 3:
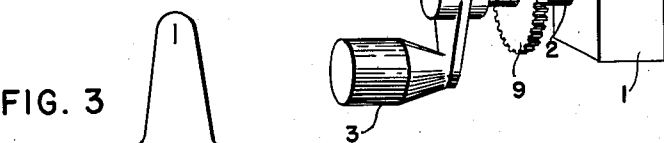
Figure 1:
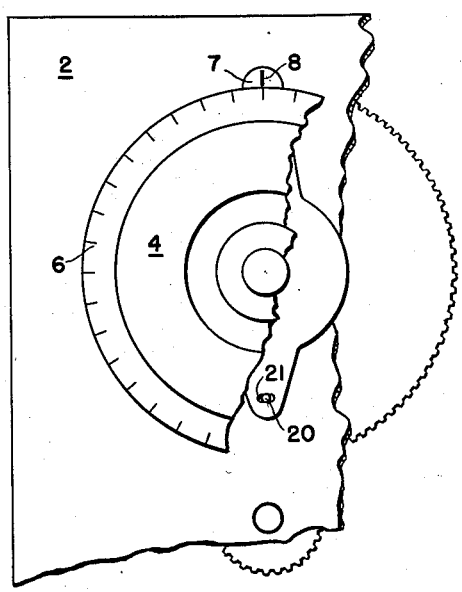
Figure 4:
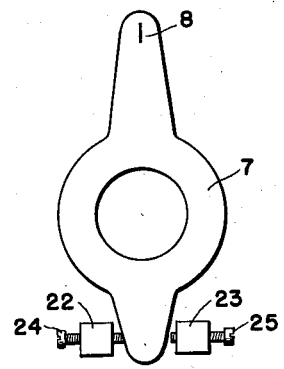

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a front view, partly broken away, of an embodiment of my invention applied to radio receiving equipment or the like; Fig. 2 is an exploded view of the parts shown in assembly in Fig. 1; Fig. 3 is a plan view of the indicating member shown in Figs. 1 and 2; and Fig. 4 illustrates a modified form of one of the components of the apparatus shown in Figs. 1 and 2.

In the drawing, there is illustrated one possible arrangement of parts particularly adapted to permit the indirect drive of a mechanical movement, such as radio receiving apparatus, for example, in an hermetically sealed case, a suitable dial or indicating means and a suitable control or tuning member being mounted externally of the case housing the receiver. In such an arrangement an indirect driving means represented generally by the numeral 1 may be employed as a coupling device. The details of the apparatus controlled and the coupling device form no part of the present invention and, therefore, are not illustrated. It is to be understood, however, that either the apparatus or mechanical movement to be adjusted to one of a plurality of positions or the coupling or both may have lost motion or backlash. Means for tuning or adjusting the mechanical movement through the coupling 1 may comprise a shaft 2 and a suitable adjusting member such as the knob or the crank 3 suitably attached to the shaft 2.

Means is provided for indicating the position of the apparatus being tuned or adjusted comprising a suitable dial 4 mounted on the outside of a suitable panel 5.

In the illustrated embodiment of my invention, the dial 4 is provided with a plurality of radially directed reference indicia 6 disposed about the circumference of the dial. Associated with dial 4 is a cooperating indicating member 7 having a fiducial line 8.

Means is provided for driving the dial from shaft 2 including a suitable gear 9 carried by shaft 2 and a suitable gear 10 arranged in any desired manner (not shown) on the rear of panel 5. Gear 10 is provided with stub shaft 11 which projects through a suitable opening 17 in panel 5. A mounting plate 12 is concentrically attached to the face of gear 10 in any suitable manner as by means of a plurality of screws 13 and preferably extends through opening 17. The plate 12 is shown to be shouldered as indicated at 14 to receive an annular ring 15 of friction material and member 7 which has an opening adapted to permit the indicating member 7 to fit over the shoulder 14. The plate 12 is provided with a second shoulder 16 over which is fitted dial 4, the latter being held in place with respect to the shaft 11 by a suitable washer 18 and nut 19 adapted to be threaded or otherwise suitably secured to the end of shaft 11.

In operation, as the knob or crank 3 is turned, gear 10 is caused to rotate and carry with it dial 4. Because of the frictional engagement between member 15 interposed between the indicating member 7 and plate 12, the indicating member 7 moves with dial 4. As long as member 7 is permitted to move with dial 4, or similarly to dial 4, the fiducial mark 8 remains relatively fixed with respect to the indicia markings on the circumference of dial 4. In order to limit movement of indicating member 7 in one or both directions of motion of member 7 to a predetermined extent or amount with respect to dial 4, there is provided stop means. In the embodiment shown in Fig. 2 the stop or motion-limiting means takes the form of a pin 20 fixed against movement. For example, pin 20 may be carried by panel 5 and extend through a suitably formed slot 21 in a portion of indicating member 7. With this arrangement, the indicating member 7 can be rotated in either direction of rotation only until the pin 20 engages the end of slot or opening 21. Beyond this point, the limiting action of stop 20 overcomes the frictional engagement between member 7 and the remaining parts of the assembly, and dial 4 thereafter rotates with respect to the member 7.

The slot or opening 21 constitutes one means of compensating for lost motion beyond shaft 2. The length of the slot should be proportional to the amount of backlash or lost motion in the system. If the amount of lost motion increases with use of the apparatus the slot may be lengthened.

The method chosen to determine the amount of slack and hence the length of the slot depends upon the type of apparatus or mechanical movement involved. If the device is used on radio apparatus, for example, an oscilloscope may be used to detect the maximum rotation of the indicating apparatus before there is any detectable change of frequency. The amount of dial movement before any such frequency change dictates the proper length of the slot.

If a machine such as a lathe is involved, the same procedure may be used except for the use of a suitable dial indicator, for example, instead of the oscilloscope described above. Application to other types of apparatus will be obvious to those skilled in the art. The amount of movement is proportional to the amount of backlash or lost motion.

In Fig. 4 there is shown an alternative means for limiting the motion of indicating member 7. In this form of my invention, the slot 21 is replaced by a pair of stops in the form of blocks 22 and 23 suitably carried on the panel 5 and a pair of set screws 24 and 25 suitably extended through blocks 22 and 23, respectively, as by threaded engagement, for example. With this arrangement, the indicating member 7 may move or rotate about its axis in either direction except as limited by set screws 24 and 25. It is also within the scope of my invention to provide only one adjustable stop mechanism, the other being fixed but it is preferred to employ two stop means in order to enable adjustment for lost motion in either direction.

While I have shown and described a particular embodiment of my invention, it will be obvious to those skilled in the art that changes and modifications may be made without departing from my invention in its broader aspects. For example, referring to Fig. 2, instead of slot 21, there may be provided a shallow recess for receiving pin 20. Further, friction member 15 may be interposed between dial 4 and indicating member 7 or friction rings may be provided on either side of member 7. As another modification, the dial may be engaged directly by the fingers instead of being indirectly driven. I, therefore, aim in the appended claims to cover all such changes and modifications as fall within the true spirit and scope of my invention.

What I claim is:

1. In combination with a mechanical movement having lost motion and means for adjusting said movement to a plurality of positions, means for compensating for said lost motion comprising indicating means having reference indicia, a member having a fiducial mark cooperating with said reference indicia to indicate the position of adjustment of said movement, means for causing said member to move similarly to said indicating means during the movement of said adjusting means corresponding to the taking up of said lost motion whereby said indicia and said fiducial mark remain relatively fixed with respect to each other, and means for substantially preventing motion of said member with said adjusting means during actual changes in position of said movement whereby said indicia and said fiducial mark move relatively to each other.

2. In combination with a mechanical movement having lost motion and means for adjusting said movement to a plurality of positions, means for compensating for said lost motion comprising indicating means having reference indicia, a member having a fiducial mark cooperating with said reference indicia to indicate the position of adjustment of said movement, means for causing said member to move similarly to said indicating means during the movement of said adjusting means to take up said lost motion whereby said indicia and said fiducial mark remain relatively fixed with respect to each other, and stop means arranged for engagement with a portion of said member for limiting the movement of said member with said adjusting means to a predetermined amount.

3. In combination with a mechanical movement having lost motion and means for adjusting said movement to a plurality of positions, means for compensating for said lost motion comprising indicating means having reference indicia, a member having a fiducial mark cooperating with said reference indicia to indicate the position of adjustment of said movement, means for causing said member to move similarly to said indicating means during the movement of said adjusting means to take up said lost motion whereby said indicia and said fiducial mark remain relatively fixed with respect to each other, and a pair of stops for engaging different portions of said member for limiting movement of said member with said adjusting means to a predetermined extent in two directions of movement.

4. In combination with a mechanical movement having lost motion and means for adjusting said movement to a plurality of positions, means for compensating for said lost motion comprising indicating means having reference indicia, a member having a fiducial mark cooperating with said reference indicia to indicate the position of adjustment of said movement, means for causing said member to move similarly to said indicating means during the movement of said adjusting means to take up said lost motion whereby said indicia and said fiducial mark remain relatively fixed with respect to each other, and means for limiting motion of said member during actual changes in position of said movement whereby said indicia and said fiducial mark move relative to each other, said limiting means comprising an opening in a portion of said member and a pin extending into said slot for limiting movement of said member to a predetermined amount upon engagement between said pin and an edge of said slot.

5. In combination with a mechanical movement having lost motion and means for adjusting said movement to a plurality of positions, means for compensating for said lost motion comprising indicating means having reference indicia, a member having a fiducial mark cooperating with said reference indicia to indicate the position of adjustment of said movement, said member having frictional engagement with said indicating means whereby said member moves with said indicating means during the movement of said adjusting means corresponding to the taking up of lost motion in said movement, and means for overcoming said frictional engagement and for preventing further movement of said member with respect to said indicating means during continued movement of said indicating means in the same direction.

WILLIAM KARLE SCHNEPF.

REFERENCES CITED

The following references are of record in the file of this patent:

UNITED STATES PATENTS

| Number | Name | Date |
| --- | --- | --- |
| 1,508,875 | Davis | Sept. 16, 1924 |
| 1,655,627 | Rothweiler | Jan. 10, 1928 |
| 1,879,294 | Jones et al. | Sept. 27, 1932 |
| 2,418,972 | Gay | Apr. 15, 1947 |
| 2,448,473 | Shrewsbury | Aug. 31, 1948 |

FOREIGN PATENTS

| Number | Country | Date |
| --- | --- | --- |
| 408,394 | Great Britain | Apr. 12, 1934 |